(12) United States Patent
Furbeck (10) Patent No.: US 9,661,104 B2
(45) Date of Patent: May 23, 2017

(54) METHOD AND APPARATUS FOR RECEIVING PRESENTATION METADATA

(75) Inventor: David Stuart Furbeck, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 189 days.

(21) Appl. No.: 13/022,572

(22) Filed: Feb. 7, 2011

(65) Prior Publication Data

US 2012/0203867 A1   Aug. 9, 2012

(51) Int. Cl.

| | |
|---|---|
| *G06F 15/16* | (2006.01) |
| *H04L 29/08* | (2006.01) |
| *H04L 29/06* | (2006.01) |
| *H04N 21/2343* | (2011.01) |
| *H04N 21/643* | (2011.01) |
| *H04N 21/8543* | (2011.01) |
| *G06F 17/30* | (2006.01) |
| *G06F 17/21* | (2006.01) |
| *G06F 17/24* | (2006.01) |

(52) U.S. Cl.
CPC .......... *H04L 67/36* (2013.01); *H04L 65/4084* (2013.01); *H04L 65/608* (2013.01); *H04L 65/80* (2013.01); *H04N 21/23439* (2013.01); *H04N 21/643* (2013.01); *H04N 21/8543* (2013.01); *G06F 17/211* (2013.01); *G06F 17/24* (2013.01); *G06F 17/30056* (2013.01)

(58) Field of Classification Search
CPC . H04L 67/34; H04L 65/4084; H04L 65/1083; H04L 67/36; H04L 65/608; H04L 65/80; H04N 21/23106; H04N 21/23439; H04N 21/8543; H04N 21/643; G06F 17/30058; G06F 17/30923; G06F 17/30056; G06F 17/211; G06F 17/24

USPC .......... 709/201–231; 307/150–190; 725/105, 725/87; 715/732
See application file for complete search history.

(56) References Cited

U.S. PATENT DOCUMENTS

| | | |
|---|---|---|
| 8,468,262 B2 | 6/2013 | Furbeck et al. |
| 2007/0043686 A1* | 2/2007 | Teng ................ G06F 17/30923 |
| 2008/0005676 A1 | 1/2008 | Evans et al. |
| 2008/0044164 A1 | 2/2008 | Fujinami et al. |
| 2009/0063649 A1 | 3/2009 | Yamagishi |

(Continued)

FOREIGN PATENT DOCUMENTS

| | | |
|---|---|---|
| TW | 200929973 | 7/2009 |
| TW | 329304 | 8/2010 |
| WO | 2010107625 | 9/2010 |

OTHER PUBLICATIONS

3GPP TS 26.234, v.9.0.0, "3rd Generation Partnership Project; Technical Specification Group Services and System Aspects; Transparent end-to-end Packet-switched Streaming Service (PSS); Protocols and codecs (Release 9)," Sep. 2009.

(Continued)

*Primary Examiner* — Jungwon Chang
(74) *Attorney, Agent, or Firm* — Fish & Richardson P.C.

(57) ABSTRACT

Method and devices for a client device to receive a presentation streamed via HTTP. The client device receives a first segment of the presentation, the first segment including presentation metadata related to a first presentation description of the presentation. The client device sends a request based at least in part on a portion of the presentation metadata related to the first presentation description.

17 Claims, 6 Drawing Sheets

(56) References Cited

U.S. PATENT DOCUMENTS

| | | | |
|---|---|---|---|
| 2009/0303255 A1 | 12/2009 | Paila et al. | |
| 2010/0235472 A1 | 9/2010 | Sood et al. | |
| 2010/0235528 A1 | 9/2010 | Bocharov et al. | |
| 2010/0262711 A1 | 10/2010 | Bouazizi | |
| 2010/0318600 A1 | 12/2010 | Furbeck | |
| 2011/0119394 A1* | 5/2011 | Wang et al. | 709/231 |
| 2011/0196982 A1* | 8/2011 | Chen et al. | 709/231 |
| 2011/0238789 A1* | 9/2011 | Luby | H04N 21/23106 709/219 |
| 2011/0307545 A1* | 12/2011 | Bouazizi | 709/203 |
| 2011/0307581 A1* | 12/2011 | Furbeck | H04L 65/1083 709/219 |
| 2012/0110201 A1* | 5/2012 | Furbeck | G06F 17/30058 709/231 |
| 2012/0290644 A1* | 11/2012 | Gabin | H04L 65/4084 709/203 |

OTHER PUBLICATIONS

3GPP TS 26.244, v. 9.0.0, "3rd Generation Partnership Project; Technical Specification Group Services and System Aspects; Transparent end-to-end packet switched streaming service (PSS); 3GPP file format (3GP)(Release 9)," Dec. 2009.

3GPP TS 26.247, v.1.0.0, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH)(Release 10)," Sep. 2010.

ISO/IEC 14496-12, Third Edition, International Standard, "Information technology—Coding of audio-visual objects—Part 12: ISO base media file format," Oct. 15, 2008.

3GPP TSG-SA4 Meeting #61, S4-100828, "Adding Simple MPD Delta File Support to 3GP-DASH," Barcelona, Spain, Nov. 8-12, 2010.

3GPP TSG-SA4 Meeting #62, S4-110044, "Live Services and Timing for DASH," Berlin, Germany, Jan. 10-14, 2011.

Furbeck, David S.; U.S. Appl. No. 12/917,431, filed Nov. 1, 2010; Title: Method and Apparatus for Updating HTTP Content Descriptions.

International Searching Authority, "International Search Report," issued in connection with application serial No. PCT/US12/24123, mailed May 23, 2012, 3 pages.

International Searching Authority, "Written Opinion of the International Searching Authority" issued in connection with application serial No. PCT/US12/24123, mailed May 23, 2012, 6 pages.

Extended European Search Report issued in European Application No. 12745166.4 on Apr. 22, 2016.

Office Action issued in Chinese Application No. 201280008025.5 on May 13, 2016.

Furbeck, David; "DASH MPD Delta Files"; International Organization for Standardization, ISO/IEC JTC1/SC29/WG11, Coding of Moving Pictures and Audio, MPEG2010/M 18482; Guangzhou, China; Oct. 4, 2010; 10 pages.

Taiwan Intellectual Property Office, "Notice of Allowance," issued in connection with corresponding Taiwanese Patent Application No. 101103681, Apr. 15, 2014 (4 pages).

Taiwan Intellectual Property Office, "Search Report," issued in connection with corresponding Taiwanese Patent Application No. 101103681, Apr. 15, 2014 (1 page).

Office Action issued in Chinese Application No. 201280008025.5 on Nov. 30, 2016.

Communication Pursuant to Article 94(3) EPC issued in European Application No. 12745166.4 on Apr. 6, 2017.

* cited by examiner

METHOD AND APPARATUS FOR RECEIVING PRESENTATION METADATA

FIELD OF TECHNOLOGY

The present invention relates generally to hypertext transfer protocol (HTTP) streaming, and more particularly to a method and apparatus for indicating changes to presentation descriptions.

BACKGROUND

An HTTP Streaming client uses HTTP GET requests to receive a media presentation. The presentation is described in a presentation description, e.g., an XML document called a Media Presentation Description (MPD), which is described in 3GPP TS 26.247. From the MPD, the client can learn in which formats the media content is encoded (e.g., bitrates, codecs, resolutions, languages, and so forth). The client then chooses a format, which may be based on one or more of screen resolution, channel bandwidth, channel reception conditions, language preferences of a user, and so forth.

With HTTP Streaming, the media is received a portion at a time. This is necessary for live content so that media playout of the content does not fall too far behind live encoding. It also enables the client to switch to a different encoding adaptively according to channel conditions, etc. Segments in 3GPP HTTP Adaptive Streaming are downloadable portions of the media whose locations (URL and possibly a byte range) are described in the MPD. In other words, the client is informed how to access the segments via the MPD.

In 3GPP, the HTTP Streaming client assumes the use of the 3GPP file format and movie fragments. The 3GPP file format is based on the ISO/IEC 14496-12 ISO Base Media File Format. Media files, in accordance with the 3GPP file format, comprise of a series of objects called boxes. Boxes can contain media data or metadata. Each box has an associated boxtype (typically a 4 character name for 32 bits total) and an associated size (typically a 32 bit unsigned integer). In non-fragmented files, a moov metadata box contains all of the codec information, timing information, and location information needed to play the media data. For fragmented media files of HTTP Streaming, the moov box only contains codec information and all of the timing information and location information is contained within the movie fragments themselves. Movie fragments typically comprise one or more pairs of a moof box and an mdat box. The moof box contains metadata for the movie fragment and the mdat box contains media data for the movie fragment. The use of fragmented files enables the encoder to write and the client to receive the media a portion at a time. This minimizes startup delay by including metadata in the moof boxes of the media fragments as opposed to up front in the moov box. The moov box still contains a description of the codecs used for encoding, but does not contain any specific information about the media samples such as timing, offsets, etc. moof boxes are only allowed to contain references to the codecs listed in the moov box. If a new codec needs to be used that has not been defined in the moov box, then a new moov box needs to be created in a new file because it is not valid to have two moov boxes within the ISO based media file format.

A presentation description (such as an MPD) comprises at least one period, a period comprises at least one representation, and a representation comprises at least one segment. A segment contains one or more movie fragments. All of the segments of one particular encoded format are referred to as a representation. Each representation has one corresponding initialization segment, which may be common amongst different representations (containing a moov box in the case of 3GPP). Each period implies a new moov box and a decoder initialization.

Currently in the specifications for HTTP Streaming, there is no requirement that the client fetch an updated MPD at a regular interval during live streaming. The client is informed of the addresses of media segments via the MPD. When a playlist structure of the MPD is used with live streaming, the MPD may be updated with the locations of the newly encoded segments one or a few at a time. The client fetches an updated MPD by issuing an HTTP GET or partial GET (a GET that uses the range request header to specify a byte range). So, if a client has fetched the MPD 30 minutes into a live presentation and the user wants to watch from the beginning of the presentation, the client has all of the segment locations needed for the next 30 minutes (assuming that the time shift buffer is at least 30 minutes in duration). Hence, the client does not need to download a new MPD for approximately 30 minutes (at which point it would run out of data). Also, if segment locations are advertised in the MPD before the segments are created, then the client can know the locations of segments into the future and does not need to fetch an MPD every time that a new segment gets encoded. Thus, the client may fetch an updated MPD very infrequently. For both of these cases 1) the client tunes in late to a live presentation and wants to watch/listen to the presentation from the beginning and 2) the segment locations are advertised in advance of their existence so that the client may know segment locations well into the future, the client may not fetch an updated MPD for a relatively long interval according to the current specification.

The information provided in the MPD guides the 3GPP Adaptive HTTP streaming client. A client successfully fetches an MPD when in response to a request for the latest MPD, the client either receives an updated MPD or receives an indication that allows the client to verify that the MPD has not been updated since the previous fetch.

In accordance with existing standards, a client is forced to fetch an updated MPD only when it receives multiple 404 http error codes or if it runs out of segment location information. Thus, a server cannot gracefully cause a client to update its MPD and cannot gracefully migrate its media files or segments to different locations.

Additionally, clients assume that media segment locations can be advertised even before the segments are actually available. So the client may know a media segment's future location before the media segment actually exists. Therefore the client must calculate, for each and every segment, at what time the segment becomes available. The client cannot assume that because the media segment location is available in the MPD that the media segment itself is available.

To gracefully require a client to update its MPD, a client may be notified that an MPD update has occurred by one or more indications in a box within a segment of a media file. In other words, a client may be notified inband that an MPD update has occurred. An example media update box is shown below:

```
aligned(8) class MPDUpdateBox
    extends FullBox('mupe') {
    unsigned int(3)   mpd_information_flags;
    unsigned int(1)   new_location_flag;
    unsigned int(28)  latest_mpd_update_time;
    /// The following are optional fields
    string mpd_location
}
```

For this example, the following semantics are used:

mpd_information_flags: contains the logical OR of zero or more of the following reason codes: 0x00 Media Presentation Description update now, 0x01 Media Presentation Description update ahead, 0x02 End-of-presentation, and 0x03-0x07 reserved;

new_location_flag: if set to 1, then the new Media Presentation Description is available at a new location specified in mpd_location;

latest_mpd_update_time: indicates the time in milliseconds by when an MPD update is necessary relative to when the latest MPD was issued, i.e., an MPD issue time, so that a client may update the MPD any time between now and the latest_mpd_update_time; and mpd_location: present if and only if the new_location_flag is set and provides a Uniform Resource Locator (URL) for the new Media Presentation Description.

BRIEF DESCRIPTION OF THE DRAWINGS

For a more complete understanding of the disclosure, reference is now made to the following brief description, in connection with the accompanying drawings and detailed description, wherein line reference numerals represent like parts.

DETAILED DESCRIPTION

Where considered appropriate, reference numerals may be repeated among the figures to indicate corresponding or analogous elements for simplicity and clarity of illustration. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Clients receiving a presentation via HTTP streaming that work out of a time shift buffer (i.e. presenting media segments that are not the most recent) may not see the inband updates and may not be aware that the MPD location has changed.

Additionally, if the client is not provided the reason for the change, then it may fetch the most recent MPD when it didn't need to. For example, an MPD may have been updated in a way that does not affect the client such as when the reason for the MPD update is to start a new period, but the client has just received an input to seek back in time. Such a client does not need to fetch an MPD at this instant in time. On the other hand, if all segments of a representation or MPD have been migrated to a different server, the client needs to fetch the latest MPD to get the locations of the segments. Additional information may be useful to the client about the reason for change in the case where representations are located on different servers and one or more but not all of the representations have been migrated. If the representation that the client is currently consuming has not been migrated, then there is no need for the client to immediately fetch the latest MPD or begin fetching media segments from a new location. On the other hand, if the representation that the client is currently consuming has been migrated, then the client will want to immediately fetch the latest MPD if not provided with the locations inband. If it has been provided with new location information inband, it will want to immediately start fetching media segments from the new location.

The inband signaling, i.e., the MPD update box, may include presentation metadata indicating a reason for the MPD update and/or including indications of which parts of the presentation are affected by the change. This presentation metadata in the form of indications allow for a client to determine when to fetch the most recent updates.

Indications in the form of flags, reason codes, or text strings may be used. Flags can indicate Boolean values for the following: 1) new segments available, 2) new MPD location, 3) new segment locations, 4) other parameter values updated or added to the MPD. Reason codes can indicate multiple reasons via a single value, e.g., code 0x01=new segments available, 0x02=new MPD location, 0x03=parameter update, and so forth. A standardized text string can indicate a reason in a human readable form.

According to current HTTP streaming specifications, base URLs can be used in the MPD at the MPD level, period level, and representation level. If any of these base URLs changes to indicate a new server and/or location, this can be made known to the client. There can be an MPD level change indication, a specific period change indication (possibly the periodID or period start time), or a specific representation change indication (indicated by the representation ID). It is also possible to indicate even that specific segments within a representation have been migrated, such as by indicating a segment index for each affected segment.

As a specific example, an MPD Update Box (mpdu) provides an inband indication to an HTTP Streaming client that an update of the MPD has occurred. In addition, it also provides flags that indicate the reason for the update and if the reason is because either the MPD itself or media segments need to be accessed from a new location, information on which periods, representations, and segments are affected is provided. An example mpdu with definitions is shown below:

```
aligned(8) class MPDUpdateBox extends FullBox('mpdu', version, 0)
{
    unsigned int(1) new_segments_available_flag;
    unsigned int(1) new_MPD_location_flag;
    unsigned int(1) segment_locations_change_flag;
    unsigned int(1) parameters_added_or_updated_flag;
    unsigned int(1) changed_segments_indicated_flag;
    unsigned int(3) reserved for future use;
    if (newMPD_location_flag)
        string new_MPD_URL;
    if (changed_segments_indicated_flag)
    {
        unsigned int(1) baseURL_MPD_level_changed_flag;
        unsigned int(15) number_of_periods_with_location_changes;
        for (i=1;i<=number_of_periods_with_location_changes;i++)
        {
            string period_start;
            unsigned int(1) period_xlink_change_flag;
            unsigned int(1) period_baseURL_change_flag;
            unsigned int(14)
number_of_representations_with_location_changes;
            for (i=1;
i<=number_of_representations_with_location_changes; i++)
            {
                string representation_id;
                unsigned int(1) representation_xlink_change_flag;
                unsigned int(1) representation_baseURL_change_flag;
                unsigned int(14) number_of_segment_level_location_changes;
                for (i=1;i<=number_of_segment_level_location_changes;i++)
                {
                    unsigned int(15) segment_index;
                    unsigned int(1) sourceURL_change_flag;
                }
            }
        }
    }
}
``` new_segments_available_flag: if this flag is set then the MPD has been updated with new segments;

new_MPD_location_flag: if this flag is set then the MPD is available at a new location;

segment_locations_change_flag: if this flag is set then the location of at least one segment previously advertised in the MPD has changed;

parameters_added_or_updated_flag: if this flag is set then at least one attribute or element in the MPD unrelated to segment locations has changed;

changed_segments_indicated_flag: this flag may be set only if the new_segment_locations_change_flag is set. It is used to indicate that the box contains information about which segments have changed;

new_MPD_URL: is a null terminated string in UTF-8 characters and is present if and only if newMPD_location_flag is set. The string contains the URL of the new MPD;

baseURL_MPD_level_changed_flag: is set if the value of the baseURL attribute on the MPD level has changed in the most recent MPD update;

number_of_periods_with_location_changes: is an unsigned 15 bit integer that gives the number of periods that contain some type of location change. This could be the xlink:href attribute value of the period itself, the baseURL of the period, or any change at the representation or segment level within the period;

period_start: is a null terminated string in UTF-8 characters. The string contains the value of the start attribute for the period;

period_xlink_change_flag: is set if the value of the xlink:href attribute that references the location of the period has changed in the most recent MPD update;

period_baseURL_change_flag: is set if the value of the baseURL attribute for the period has changed in the most recent MPD update;

number_of_representations_with_location_changes: is an unsigned 14 bit integer that gives the number of representations within the period that contain some type of location change. This could be the xlink:href attribute of the representation itself, the baseURL of the representation, or any change at the segment level within the representation;

representation_id: is a null terminated string in UTF-8 characters containing the value of the id attribute of the representation;

representation_xlink_change_flag: is set if the value of the xlink:href attribute that references the location of the representation has changed in the most recent MPD update;

representation_baseURL_change_flag: is set if the value of the baseURL attribute on the representation level has changed in the most recent MPD update;

number_of_segment_level_location_changes: is an unsigned 14 bit integer that gives the number of sourceURL location changes (at the segment level);

segment_index: is an unsigned 15 bit integer that gives the value of the index of the segment. An index of 0x7FFF is used to indicate the initialisation segment; and sourceURL_change_flag: is set if the value of the sourceURL attribute of the segment that corresponds to segment_index has changed in the most recent MPD update.

Additionally, the new locations themselves can be added for all server/location changes. This provides that all of the update information of the MPD can be found inband and the client may not even need to go fetch the MPD. An example mpdu with definitions is shown below:

```
aligned(8) class MPDUpdateBox extends FullBox('mpdu', version, 0)
{
    unsigned int(1) new_segments_available_flag;
    unsigned int(1) new_MPD_location_flag;
    unsigned int(1) segment_locations_change_flag;
    unsigned int(1) parameters_added_or_updated_flag;
    unsigned int(1) new_segment_locations_present_flag;
    unsigned int(3) reserved for future use;
    if (newMPD_location_flag)
        string new_MPD_URL;
    if (new_segment_locations_present_flag)
    {
        string baseURL_MPD_level;
        unsigned int(16) number_of_periods_with_location_changes;
        for (i=1;i<=number_of_periods_with_location_changes;i++)
        {
            string period_start;
            string period_xlink;
            string period_baseURL;
            unsigned int(16)
number_of_representations_with_location_changes;
            for (i=1;
i<=number_of_representations_with_location_changes; i++)
            {
                string representation_id;
                string representation_xlink;
                string representation_baseURL;
                unsigned int(16)
number_of_segment_level_location_changes;
                for (i=1;i<=number_of_segment_level_location_changes;
i++)
                {
                    string segment_index;
                    string new_sourceURL;
                }
            }
        }
    }
}
``` new_segments_available_flag: if this flag is set then the MPD has been updated with new segments;

new_MPD_location_flag: if this flag is set then the MPD is available at a new location;

segment_locations_change_flag: if this flag is set then the location of at least one segment previously advertised in the MPD has changed;

parameters_added_or_updated_flag: if this flag is set then at least one attribute or element in the MPD unrelated to segment locations has changed;

new_segment_locations_present_flag: this flag may be set only if the new_segment_locations_change_flag is set. It is used to indicate that the box contains new segment location information;

new_MPD_URL: is a null terminated string in UTF-8 characters and is present if and only if newMPD_location_flag is set and contains the URL of the new MPD;

baseURL_MPD_level: is a null terminated string in UTF-8 characters and contains the value of the baseURL attribute on the MPD level if this value has changed in the most recent update; if this value has not changed or is not defined, then the string is empty and only the null termination character is present;

number_of_periods_with_location_changes: is an unsigned 16 bit integer that gives the number of periods that contain some type of location change; this could be the xlink:href attribute value of the period itself, the baseURL of the period, or any change at the representation or segment level within the period;

period_start: is a null terminated string in UTF-8 characters and contains the value of the start attribute for the period;

period_xlink: is a null terminated string in UTF-8 characters and contains the value of the xlink:href attribute that references the location of the period if this value has changed in the most recent update; if this value has not changed or the period is not referenced via xlink, then the string is empty and only the null termination character is present;

period_baseURL: is a null terminated string in UTF-8 characters and contains the value of the baseURL attribute on the period level if this value has changed in the most recent update; if this value has not changed or is not defined, then the string is empty and only the null termination character is present;

number_of_representations_with_location_changes: is an unsigned 16 bit integer that gives the number of representations within the period that contain some type of location change; this could be the xlink:href attribute of the representation itself, the baseURL of the representation, or any change at the segment level within the representation;

representation_id: is a null terminated string in UTF-8 characters containing the value of the id attribute of the representation;

representation_xlink: is a null terminated string in UTF-8 characters and contains the value of the xlink:href attribute that references the location of the representation if this value has changed in the most recent update; if this value has not changed or the representation is not referenced via xlink, then the string is empty and only the null termination character is present;

representation_baseURL: is a null terminated string in UTF-8 characters and contains the value of the baseURL attribute on the representation level if this value has changed in the most recent update; if this value has not changed, then the string is empty and only the null termination character is present;

number_of_segment_level_location_changes: is an unsigned 16 bit integer that gives the number of sourceURL location changes (at the segment level);

segment_index: is an unsigned 16 bit integer that gives the value of the index of the segment; an index of 0xFFFF is used to indicate the initialization segment; and new_sourceURL: is a null terminated string in UTF-8 characters and contains the value of the sourceURL attribute of the segment that corresponds to segment_index.

Another example of the information which could be communicated to the client via a box in the media segments is the contents of an MPD delta file. An MPD delta file is a difference file that contains a description of and/or the actual differences between the parts of the MPD that have changed as a result of an MPD update or updates. MPD deltas may be supported on the server because they are more bandwidth efficient when downloaded as opposed to downloading the entire MPD (especially when only a relatively small portion of the information in the MPD has actually changed). The MPD delta file could be an XML file itself or could be a text file such as a unix diff file, etc. Alternatively to or in combination with MPD delta files being available on the server, XML code containing the contents of the MPD delta file, a text string containing the MPD delta, or a binary version of the MPD delta could be encapsulated within a box contained within a media segment.

So that clients are not required to compute media segment availability for each media segment, an attribute in the MPD may indicate whether segments are immediately available or advertised in advance to the client. The attribute may be a segmentsAdvertised, or a segmentsAvailable attribute, for example. If a segmentsAdvertised attribute is set to true or a segmentsAvailable is set to false, then the segments are advertised and might not be immediately available to the client. Hence, the client cannot assume that a media segment exists on the server even though its location is in the MPD. In this case it must make a calculation based on times and durations given in the MPD as to when the media segment is available. If a segmentsAdvertised attribute is set to false or a segmentsAvailable attribute is set to true, the client can assume the media segment is available and skip the timing calculations.

Figure 1:
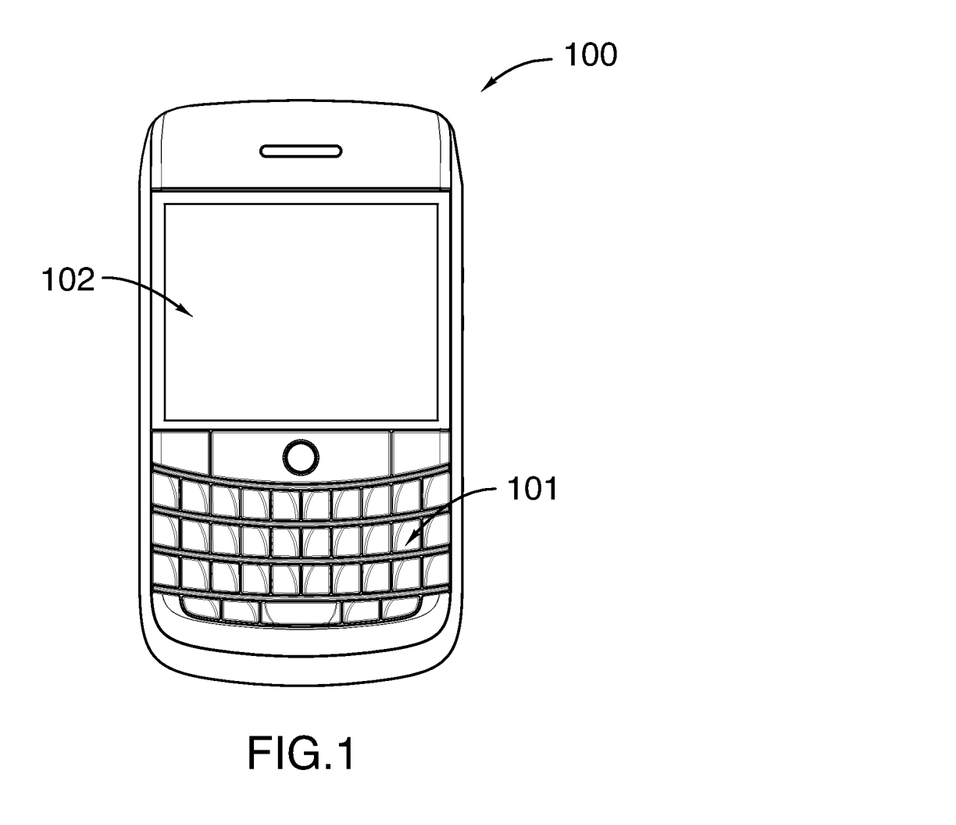
FIG. 1 is a diagram of a wireless handheld device configured to operate as a client in accordance with the present disclosure.

FIG. 1 is a diagram of a wireless handheld device configured to operate as a client in accordance with the present disclosure. The wireless handheld device 100 comprises a numeric keypad 101, a display 102 and one or more processors (not shown). The one or more processors of device 100 are configured to act as an HTTP streaming client and to perform the methods of the present disclosure. The device 100 can be configured to operate in accordance with various cellular telephone communications standards, including 3GPP.

Figure 2:
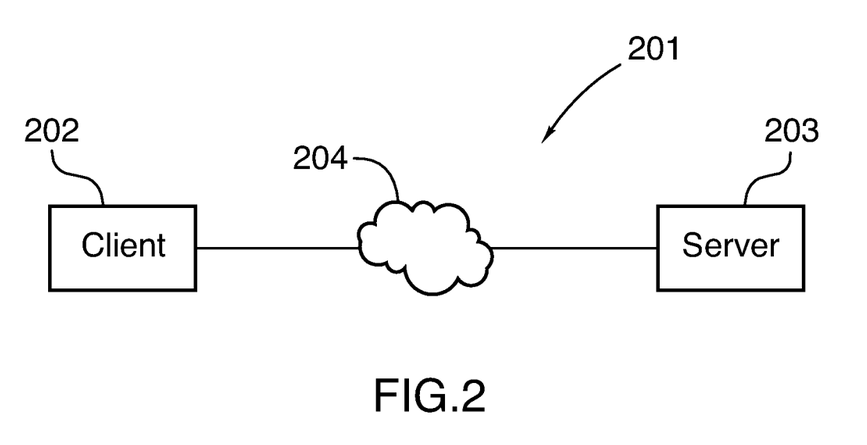
FIG. 2 is a diagram of a system configured to operate in accordance with the present disclosure.

FIG. 2 is a diagram of a system configured to operate in accordance with the present disclosure. The system 201 includes client 202 and server 203, which are communicatively connected via network 204.

The client 202 may be any device that is operable to receive a presentation in accordance with the disclosure. Examples of which include mobile telephones (e.g., wireless handheld device 100), notebook computers, netbook computers, tablet devices, laptop computers, desktop computers, and so forth, operating in accordance with various 3GPP standards.

The server 203 may be any device that is operable to send a presentation description in accordance with the disclosure. Although it is depicted as a single server, server 203 may comprise multiple servers, computers, processors, memories and data stores. Server 203 may store the MPD and may also store the presentation in the form of one or more segments. Alternatively, the one or more segments may be stored on or among different servers, memories and data stores, not shown.

The network 204 may be any type or style of network that provides for communication between the client 202 and the server 203. Examples of which include the Internet and public wireless carrier networks for mobile telephones.

Figure 3:
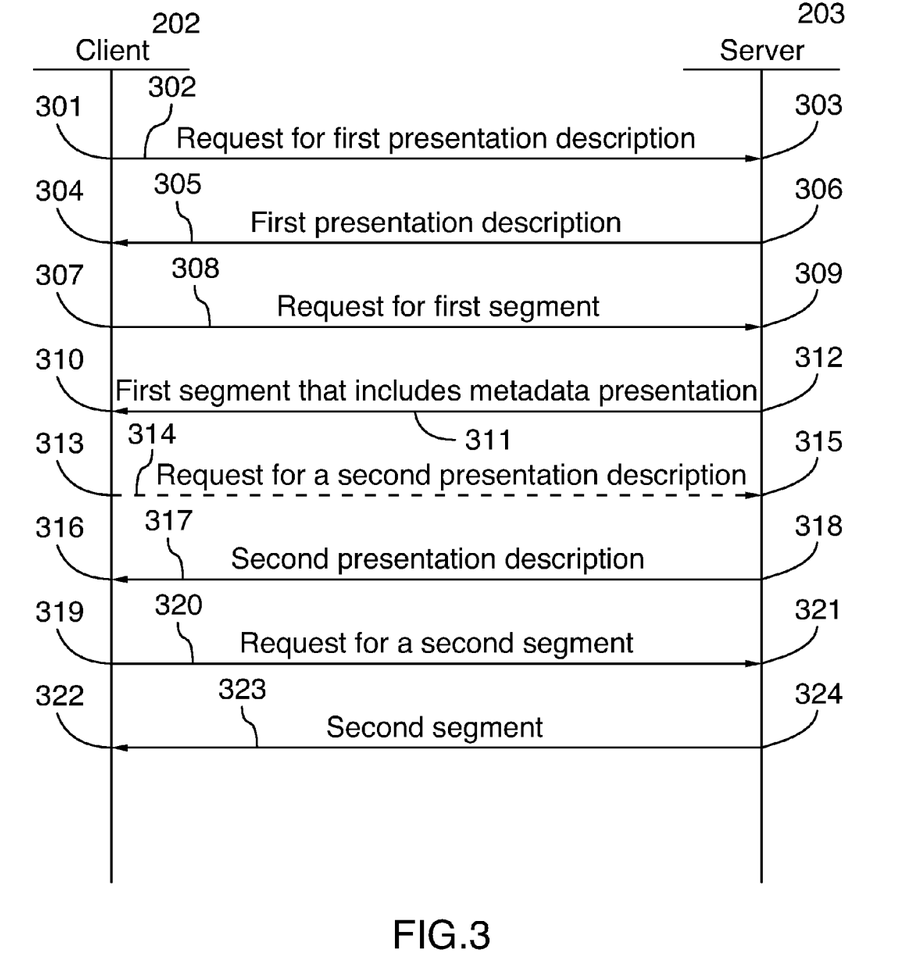
FIG. 3 is a diagram depicting the messages of a system configured to operate in accordance with the present disclosure.

FIG. 3 is a diagram depicting the messages of a system configured to operate in accordance with the present disclosure. At 301, the client 202 sends a request 302, e.g. an HTTP GET request, for a presentation description, e.g., an MPD, to server 203. At 303, server 203 receives the request 302 for the presentation description from the client 202.

At 304, the client 202 receives a first presentation description 305 from the server 203. At 306, the server 203 sends the first presentation description 305 to the client 304. The first presentation description 305 includes the location of the first segment 311 as a part of its inclusion of at least one reference to one or more segments associated with the presentation. Each segment described by the presentation description 305 is associated with a uniform resource locator (URL) and possibly a byte range, indicating a segment location for each segment.

At 307, the client 202 sends a request 308 for a first segment 311 to the server 203. As discussed above, server 203 may comprise multiple servers so that different servers may store the presentation description and segments. At 309, the server 203 receives from the client 202, the request 308 for the first segment 311.

At 310, the client 202 receives first segment 311 that was requested from the server 203. At 312, the server 203 sends the segment 311 to the client 202. The first segment 311 includes presentation metadata. As discussed above, the presentation metadata indicates a reason for the MPD update and/or includes indications of which parts of the presentation are affected by the change.

At 313, the client 202 sends a request 314 for a second presentation description (e.g., an updated MPD) to the server 203. At 315, server 203 receives the request 314 for the second presentation description from the client 202. The request 314 for the second presentation description is sent by the client 202 based at least in part on a portion of the presentation metadata that is related to the first presentation description and was received with the first segment. Such as when the presentation metadata indicates that one or more segment locations have changed.

At 316, the client 202 receives the second presentation description 317 from the server 203. At 318, server 203 sends the second presentation description 317 to the client 202. The second presentation description 317 includes all of the changes as indicated in the presentation metadata.

At 319, the client 202 sends a request 320 for a second segment to the server 203. At 321, the server 203 receives the request 320 for the second segment 323. The request 320 is in accordance with the second presentation description 317, which is in accordance with the changes indicated by the presentation metadata. As such, the request 320 may be to a different server as compared to the request 308. Additionally, the request 308 may be a partial request that only requests a portion of a segment.

At 322, the client 202 receives a second segment 323 from the server 203. At 324, the server 203 sends the second segment 323 to the client 202. As discussed above, a server sending the second presentation description 317 may be different from the server sending the segment. Furthermore this illustrates the case where the second presentation description 317 is received before the client device consumes one or more of the segments of a representation, period, or presentation description.

Figure 4:
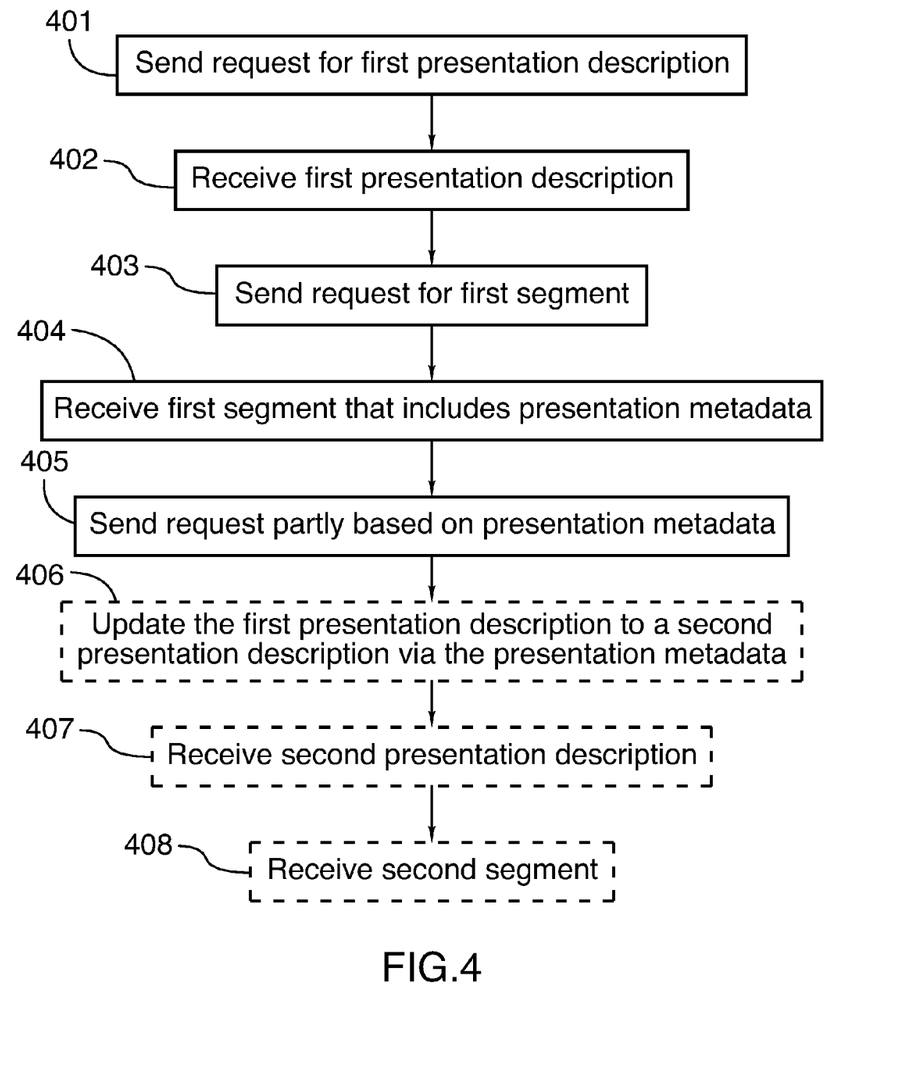
FIG. 4 is a flowchart of a method for receiving a presentation streamed via HTTP in accordance with the present disclosure.

FIG. 4 is a flowchart of a method for receiving a presentation streamed via HTTP in accordance with the present disclosure. At 401, an HTTP streaming client sends a request for a first presentation description.

At 402, the client receives a first presentation description based on the request from 401. The first presentation description includes a segment location of the first segment.

At 403, the client sends a request for a first segment of the presentation. This request is based on the segment location as described in the presentation description.

At 404, the client receives the first segment, which also includes presentation metadata. The presentation metadata includes indications for any reasons for updating the first presentation description and may include the actual updates or parts of updates, as described above.

At 405, the client sends a request partly based on the presentation metadata. This request is for one of a second presentation description of the presentation or a second segment of the presentation. This request may be based on whether the segments of the presentation description are indicated as being advertised or as being available. If the segments are indicated as being advertised, then the client must calculate when a segment is available before sending a request for that segment. If the segments are indicated as being available, then the client does not have to calculate when the segments are available and may immediately access the segments. In other words, the client may request the segment without calculating its availability when there is an indication that the segment is immediately available.

The availability indication may be comprised in the first presentation description and/or in a box of the first segment. Embodiments may have that the client: sends a request for a first presentation description; receives the first presentation description that includes the availability indication; performing availability calculations of the availability of one or more segments based on the availability indication; and sends a request based on the availability indication included in the first presentation description. Hence, the device does not perform the availability calculations when the one or more segments are indicated as available for immediate access by the client.

Alternative embodiments may have that segments that are outside of the time shift buffer are no longer available, even though the segment is listed in the presentation description and the availability indication indicates that segments listed in the presentation description are available. In this case, if the availability indication indicates that the media has been made available, then the client does not need to calculate or otherwise determine whether the media has already been made available, so long as it is within the time shift buffer. Hence, the client may still have to determine whether the segment is actually available. As an example, if the client tries to access a segment that is forty minutes behind when the time shift buffer only provides for thirty minutes of buffering, the segment will not be available since it is outside of the time shift buffer even though the availability indication indicates that the segment has already been made available. In other words, if the availability indication indicates that segments listed in the presentation description are available and the segment is within the time shift buffer, then the client can access the segment, i.e., no determinations on future availability of a segment need to be made by the client.

At 406, the client optionally updates the first presentation description to a second presentation description via the presentation metadata. In other words, the client optionally updates its copy of the first presentation description to be in accordance with the second presentation description via the presentation metadata received with the first segment. This update of the client's presentation description occurs without the client requesting the second presentation description. Here, a description delta comprised by the presentation metadata is used to update the first presentation description to the second presentation description. In other words, the in band updates including a presentation delta within the presentation metadata within a box within the first segment are used to update the first presentation description to the second presentation description at the client. Alternative embodiments may have the description delta and the other presentation metadata in separate boxes of the segment. In other words, a segment may comprise a box for presentation metadata and a box for a description delta.

At 407, the client optionally receives a second presentation description. Here, the request from 405 was for a second presentation description and, at 407, the client receives this second presentation description. As discussed above, the request was based at least on a portion of the presentation metadata.

At 408, the client optionally receives a second segment. Here, the request from 405 was for a second segment and, at 408, the client receives this second segment. As discussed above, the request was based at least on a portion of the presentation metadata, such that the segment location used in the request at 405 may be different from the segment location that is described in the first presentation description. In other words, the client used the inband update from the presentation metadata received with the first segment to request the second segment.

Figure 5:
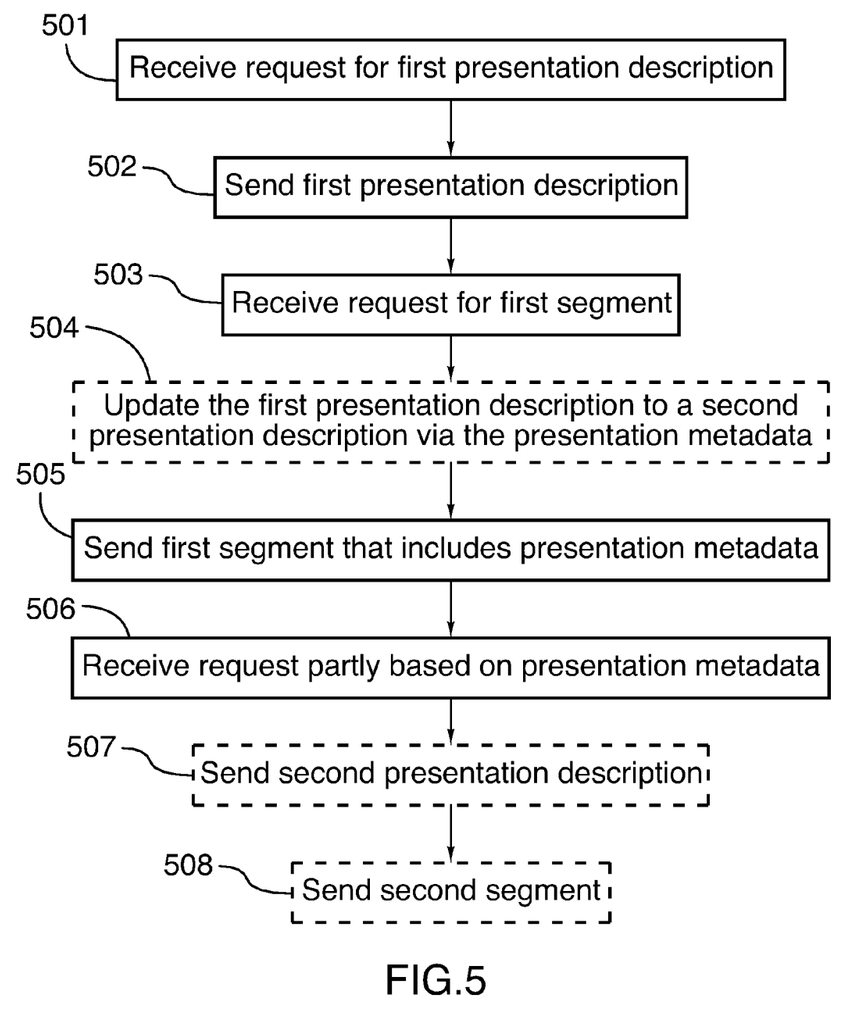
FIG. 5 is a flowchart of a method for sending a presentation streamed via HTTP in accordance with the present disclosure.

FIG. 5 is a flowchart of a method for sending a presentation streamed via HTTP in accordance with the present disclosure. At 501, a server receives a request for a first presentation description.

At 502, the server sends a first presentation description based on the content request received at 501. The first presentation description includes a segment location of the first segment.

At 503, the server receives a request for a first segment of the presentation. This request is based on the segment location as described in the presentation description.

At 504, the server optionally updates presentation metadata in a first segment of the presentation. This update may be in response to a change to the first presentation description and may occur any time after the first presentation description is sent and before the first segment is sent.

At 505, the server sends a first segment that includes presentation metadata. The presentation metadata includes indications for any reasons for updating the first presentation description and may include the actual updates, as described above.

At 506, the server receives a request that is partly based on the presentation metadata. This request is for one of a second presentation description of the presentation or a second segment of the presentation.

At 507, the server optionally sends a second presentation description. Here, the request from 506 was for a second presentation description and, at 507, the server sends this second presentation description. As discussed above, the request was based at least on a portion of the presentation metadata.

At 508, the server optionally sends a second segment. Here, the request from 506 was for a second segment and, at 508, the server sends this second segment. As discussed above, the request was based at least on a portion of the presentation metadata, such that the segment location used in the request at 506 may be different from the segment location that is described in the first presentation description. In other words, the inband update from the presentation metadata sent with the first segment was used to request the second segment.

Figure 6:
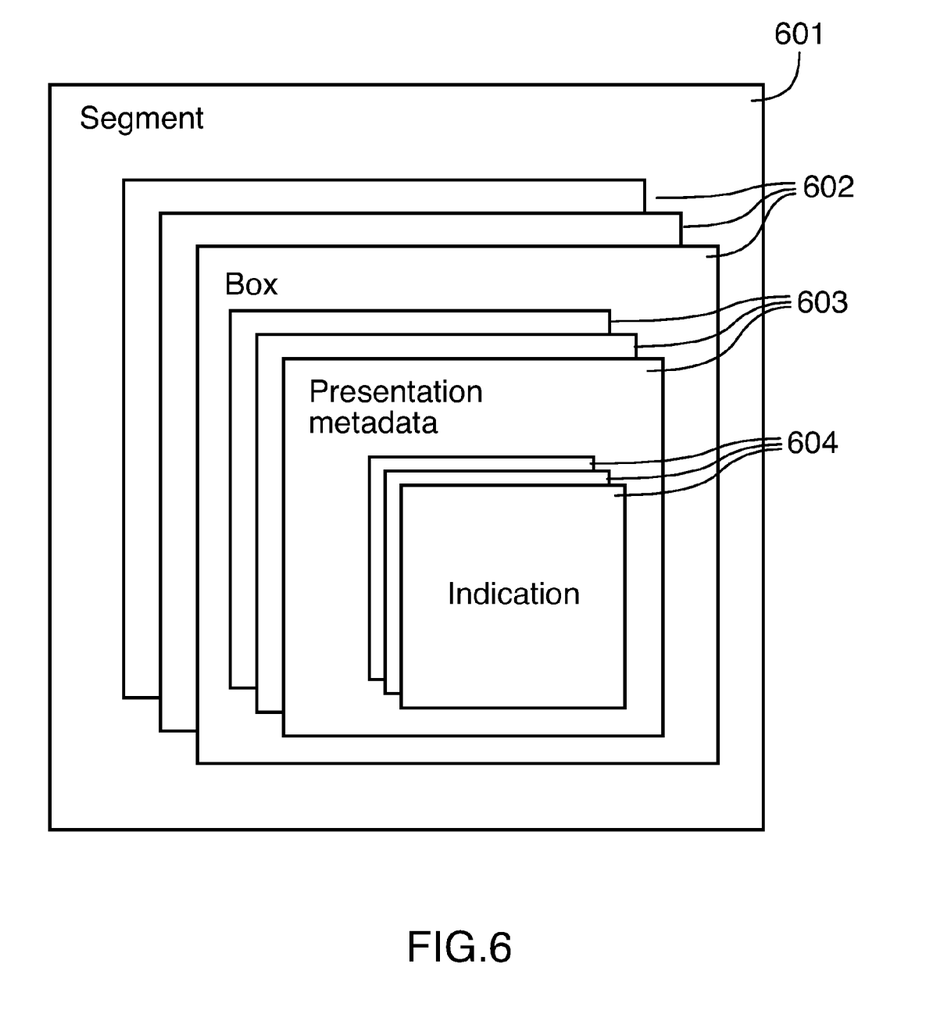
FIG. 6 is a diagram of a media presentation description in accordance with the present disclosure.

FIG. 6 is a diagram of a segment in accordance with the present disclosure. A segment 601 comprises one or more boxes 602. Each of boxes 602 may contain presentation metadata 603. Each presentation metadata 603 may contain at least one indication 604.

The presentation metadata 603 includes one or more indications 604 indicating:

that at least one new segment is available that was not previously described in the presentation description;

that location information of the at least one new segment is included in the presentation metadata;

that the presentation description is available at a new location;

that the location of at least one segment that was previously described in the presentation description is available at a new location;

that at least one attribute, or element in the presentation description has changed, wherein the at least one attribute or element is unrelated to location information of segments described by the presentation description;

the new location of the presentation description;

that a value of a baseURL attribute at a level of the presentation description has changed;

a number of how many periods, of the at least one period, have changed;

a value of a periodStart attribute of a period of the at least one period;

that a value of an xlink:href attribute that references a location of a period of the at least one period has changed;

that a value of a baseURL attribute at a level of the period has changed a number of how many representations, of the at least one representation, have changed;

a value of a representationID attribute of a representation of the at least one representation;

that a value of an xlink:href attribute that references a location of a representation of the at least one representation has changed;

that a value of a baseURL attribute at a level of a representation has changed;

a number of how many segments of the at least one segment have changed;

a value of an index of an indexed segment of the at least one segment; and that a value of a sourceURL attribute of the indexed segment has changed.

Additionally, the indication 604 that the value of a baseURL attribute has changed may include the value of the baseURL;

the indication 604 that the value of the xlink:href attribute has changed includes the value of the xlink:href attribute;

the indication 604 that the value of a baseURL attribute at a level of the period has changed includes the value of the baseURL attribute at the level of the period;

the indication 604 that the value of the xlink:href attribute has changed includes the value of the xlink:href attribute;

the indication 604 that the value of a baseURL attribute at a level of the representation has changed includes the value of the baseURL attribute at the level of the representation; and the indication 604 that the value of the sourceURL attribute has changed includes the value of the sourceURL attribute.

Code adapted to provide the systems and methods described above may be provided on many different types of computer-readable media or mediums, including computer storage mechanisms (e.g., CD-ROM, diskette, RAM, flash memory, computer hard drive, etc.) that tangibly embody software instructions for use in execution by one or more processor to perform the methods and implement the apparatus described herein.

The methods and devices disclosed herein are presented only by way of example and are not meant to limit the scope of the subject matter described herein. Other variations of the methods and devices described above will be apparent to those in the art and as such are considered to be within the scope of the subject matter described herein. For example, it should be understood that steps and the order of the steps in the processing described herein may be altered, modified and/or augmented and still achieve the desired outcome.

What is claimed is:

1. A method for receiving a media presentation streamed via HTTP, the method comprising:
    receiving, at an HTTP streaming client, a media presentation description (MPD) associated with the media presentation;
    requesting a first media segment of the media presentation with an HTTP GET request using a first media segment URL;
    receiving, at the HTTP streaming client, the first media segment, the first media segment comprising one or more movie fragments and a box according to an ISO Base Media File Format, the box including an MPD delta file, wherein the MPD delta file is a difference file which includes changes of one or more portions of the MPD that have been updated, the changes of one or more portions of the MPD comprising a second media segment URL; and
    sending a request for a second media segment of the media presentation using the second media segment URL.

2. The method of claim 1, wherein the MPD comprises an availability indication related to the availability of the second media segment and the request is sent based on the availability indication.

3. The method of claim 1, wherein the first media segment further includes an indication indicative of a reason for updating the MPD.

4. The method of claim 3, wherein the indication indicates at least one of:
    at least one new media segment is available that was not previously described in the MPD;
    location information of at least one new media segment is included in the media segment;
    the MPD is available at a new location;
    the location of at least one media segment that was previously described in the MPD is available at a new location;
    at least one attribute or element previously described in the MPD has changed;
    a new location of the MPD; or
    a value of a baseURL attribute at a level of the MPD has changed.

5. The method of claim 4, wherein the indication that the value of a baseURL attribute has changed includes the value of the baseURL.

6. The method of claim 3, wherein the updated portion of the MPD includes at least one period, and the indication indicates at least one of:
    a number of how many periods, of the at least one period, have changed;
    a value of a periodStart attribute of a period of the at least one period;
    a value of an xlink:href attribute that references a location of a period of the at least one period has changed; and
    a value of a baseURL attribute at a level of the period has changed.

7. The method of claim 6, wherein the indication that the value of the xlink:href attribute has changed includes the value of the xlink:href attribute and the indication that the value of a baseURL attribute at a level of the period has changed includes the value of the baseURL attribute at the level of the period.

8. The method of claim 3, wherein the updated portion of the MPD includes at least one period, each period includes at least one representation, and the indication indicates at least one of:
    a number of how many representations, of the at least one representation, have changed;
    a value of a representationID attribute of a representation of the at least one representation;
    a value of an xlink:href attribute that references a location of a representation of the at least one representation has changed; and
    a value of a baseURL attribute at a level of a representation has changed.

9. The method of claim 8, wherein the indication that the value of the xlink:href attribute has changed includes the value of the xlink:href attribute and the indication that the value of a baseURL attribute at a level of the representation has changed includes the value of the baseURL attribute at the level of the representation.

10. The method of claim 3, wherein the updated portion of the MPD includes at least one period, each period includes at least one representation, each representation includes at least one segment, and the indication indicates at least one of:
    a number of how many segments of the at least one segment have changed;
    a value of an index of an indexed segment of the at least one segment; or
    a value of a sourceURL attribute of the indexed segment has changed.

11. The method of claim 10, wherein the indication that the value of the sourceURL attribute has changed includes the value of the sourceURL attribute.

12. The method of claim 3, wherein the reason for updating comprises at least one of a new period start, server migration, new segment location, or parameter updates.

13. An HTTP streaming client device for receiving a media presentation streamed via HTTP, the client device comprising at least one processor configured to:
    receive a media presentation description (MPD) associated with the media presentation;
    request a first media segment of the media presentation with an HTTP GET request using a first media segment URL;

receive the first media segment, the first media segment comprising one or more movie fragments and a box according to an ISO Base Media File Format, the box including an MPD delta file, wherein the MPD delta file is a difference file which includes changes of one or more portions of the MPD that have been updated, the changes of one or more portions of the MPD comprising a second media segment URL; and send a request for a second media segment of the media presentation using the second media segment URL.

14. The client device of claim 13, wherein the MPD comprises an availability indication related to the availability of the second segment and the request is sent based on the availability indication.

15. The client device of claim 13, wherein the first media segment further includes an indication indicative of a reason for updating the MPD.

16. A tangible, non-transitory machine readable storage device or storage disk comprising code which, when executed by an HTTP streaming client device for receiving a media presentation streamed via HTTP causes the device to, at least:

receive a media presentation description (MPD) associated with the media presentation;

request a first media segment of the media presentation with an HTTP GET request using a first media segment URL;

receive the first media segment, the first media segment comprising one or more movie fragments and a box according to an ISO Base Media File Format, the box including an MPD delta file, wherein the MPD delta file is a difference file which includes changes of one or more portions of the MPD that have been updated, the changes of one or more portions of the MPD comprising a second media segment URL; and send a request for a second media segment of the media presentation using the second media segment URL.

17. The machine readable storage device or storage disk of claim 16, wherein the MPD comprises an availability indication related to the availability of the second segment and the request is sent based on the availability indication.

* * * * *